US006974258B2

(12) United States Patent
Borcherding et al.

(10) Patent No.: US 6,974,258 B2
(45) Date of Patent: Dec. 13, 2005

(54) LIMITED SWIVEL SELF-ALIGNING BEARING ASSEMBLY

(75) Inventors: Gary W. Borcherding, Florissant, MO (US); L. Ranney Dohogne, Creve Coeur, MO (US)

(73) Assignee: Emerson Electric Co., St. Louis, MO (US)

( * ) Notice: Subject to any disclaimer, the term of this patent is extended or adjusted under 35 U.S.C. 154(b) by 155 days.

(21) Appl. No.: 10/646,977

(22) Filed: Aug. 22, 2003

(65) Prior Publication Data

US 2005/0041897 A1    Feb. 24, 2005

(51) Int. Cl.[7] .............................................. F16C 23/04
(52) U.S. Cl. ...................................... 384/192; 384/209
(58) Field of Search ......................... 384/192, 202–214; 310/89, 90

(56) References Cited

U.S. PATENT DOCUMENTS

| 2,452,352 | A |   | 10/1948 | Booth |
| 3,248,955 | A |   | 5/1966 | Templeton |
| 3,754,802 | A | * | 8/1973 | Keller ........................ 384/203 |
| 3,794,392 | A |   | 2/1974 | Scott |
| 3,947,077 | A |   | 3/1976 | Berg et al. |
| 4,014,596 | A | * | 3/1977 | Kazama ..................... 384/207 |
| 4,369,387 | A |   | 1/1983 | Haar et al. |
| 4,910,424 | A |   | 3/1990 | Borcherding |
| 5,113,104 | A | * | 5/1992 | Blaettner et al. .......... 384/210 |
| 5,209,596 | A |   | 5/1993 | Matczak et al. |
| 5,857,780 | A |   | 1/1999 | Newberg et al. |
| 6,196,726 | B1 |  | 3/2001 | Newberg et al. |
| 6,252,321 | B1 | * | 6/2001 | Fisher et al. .................. 310/89 |
| 6,257,767 | B1 |  | 7/2001 | Borcherding et al. |

* cited by examiner

Primary Examiner—Thomas R. Hannon
(74) Attorney, Agent, or Firm—Thompson Coburn LLP

(57) ABSTRACT

A motor shaft bearing assembly restricts the pivoting or swiveling movement of a self-aligning bearing supporting a motor shaft in a bearing seat. The bearing assembly provides projections adjacent the bearing seat that engage with an exterior surface of the bearing to restrict the movement of the bearing relative to the bearing seat. As an alternative or in addition to the projection adjacent to the bearing seat, a bearing retainer holding the bearing against the bearing seat is provided with a projection that engages into the exterior surface of the bearing to restrict the movement of the bearing relative to the bearing seat.

19 Claims, 6 Drawing Sheets

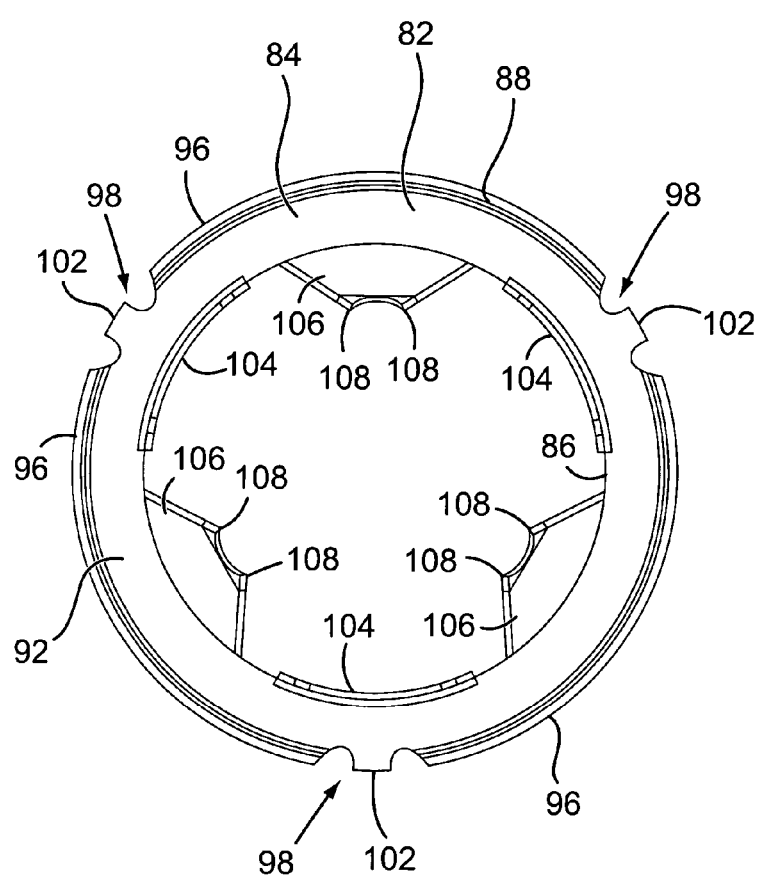
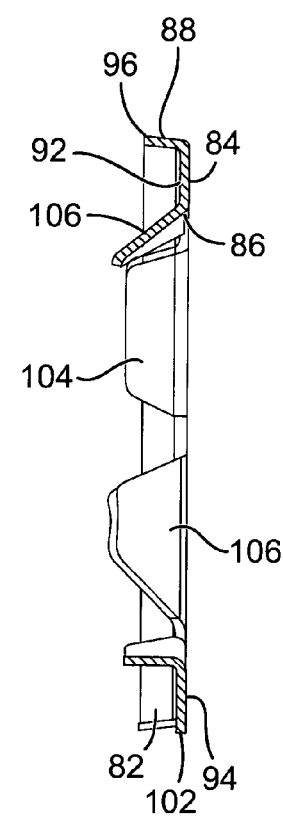
Fig. 6
Fig. 7

LIMITED SWIVEL SELF-ALIGNING BEARING ASSEMBLY

BACKGROUND OF THE INVENTION (1) Field of the Invention

The present invention pertains to a motor shaft bearing assembly in which a self-aligning bearing supports the motor shaft in a bearing seat to allow pivoting movement of the motor shaft relative to bearing seat during motor assembly. In addition, the bearing assembly includes a projection adjacent the bearing seat that engages into an end face of the bearing to restrict the movement of the bearing relative to the bearing seat. As an alternative or in addition to the projection adjacent the bearing seat, a bearing retainer holding the bearing against the bearing seat is provided with a projection that engages into the exterior surface of the bearing to restrict the movement of the bearing relative to the bearing seat.

(2) Description of the Related Art

Various different types of bearing assemblies have been employed in mounting rotating shafts to a supporting structure. For example, in the construction of electric motors, bearing assemblies employing ball bearings, roller bearings, babbitt bearings, and self-aligning bearings have been used in supporting the rotating shaft of the electric motor in an end shield of the motor.

Of the above-mentioned different types of bearing assemblies, the bearing assembly employing a self-aligning bearing is typically more cost efficient than the other types of bearing assemblies. This is primarily because the use of ball bearing, roller bearing or babbitt bearing assemblies requires expensive machining steps to be performed on the motor end shield before the bearing assembly can be mounted in the end shield.

The self-aligning bearing is typically constructed of sintered metal. The bearing is formed with a generally spherical exterior surface and a pair of flat, axially opposite end face surfaces. A shaft center bore passes through the bearing between the end face surfaces.

In mounting the bearing on a motor end shield, the bearing is positioned on a bearing seating surface that has been inexpensively cast on the motor end shield. A bearing retainer having resilient fingers or tabs is assembled to the end shield. The bearing retainer tabs engage against and urge the bearing against the bearing seat of the end shield. The motor shaft can then be inserted through the bearing center bore. The construction of the self-aligning bearing permits the motor shaft and the bearing to pivot or swivel relative to the end shield bearing seat as the motor is assembled.

However, there are certain situations in which the swiveling or pivoting movement of the self-aligning bearing relative to the motor end shield bearing seat is undesirable. Many small horsepower motors are assembled by bonding the motor's stator between a pair of motor end shields. An epoxy is often used as the adhesive. After assembly of the motor component parts between the end shields, the component parts must not move relative to each other as the epoxy cures. The ability of the self-aligning bearing to pivot or swivel relative to the end shield bearing seat will at times allow the motor shaft to move relative to the end shield before the epoxy is fully cured. This can result in defects in the motor construction. For example, movement of the motor shaft can cause a cooling fan mounted on the motor shaft to come into contact with a portion of the adjacent end shield.

To overcome the above disadvantage of self-aligning bearing assemblies used in the construction of electric motors, a restraining force could be used on the bearing to hold the self-aligning bearing stationary against the bearing seat. However, because most self-aligning bearings are sintered bearings, increasing the force on the bearing exterior to hold the bearing stationary against the end shield bearing seat could deform the interior shaft bore of the bearing.

SUMMARY OF THE INVENTION

The self-aligning bearing assembly of the present invention overcomes the above-described disadvantages associated with the prior art self-aligning bearing assemblies. This is accomplished by providing a modified construction of the self-aligning bearing assembly that limits or restricts the swiveling or pivoting movement of the bearing relative to the end shield bearing seat. By restricting the movement of the self-aligning bearing, the earlier described problems associated with using self-aligning bearings are overcome.

In a first embodiment of the bearing assembly of the invention, a projection is provided on the end shield at a position adjacent the bearing seat surface. In one embodiment, the projection is an integral part of the end shield. In an alternate embodiment, the projection is on a disk assembled to the end shield. The projection is positioned to be flush with or extend into one of the axially opposite end face surfaces of the bearing when the motor is assembled. Because the projection extends in an axial direction and is in contact with the end face surface of the bearing, it does not present the problem of potentially deforming the interior shaft bore of the bearing. The projection in contact with the bearing end face surface restricts the swiveling or pivoting movement of the bearing relative to the end shield.

In a second embodiment of the bearing assembly of the invention, the bearing retainer is modified to restrict the movement of the bearing relative to the end shield bearing seat. The bearing retainer resilient tabs that hold the bearing against the bearing seat are provided with projections that extend into or dig into the exterior surface of the bearing. The resilient tabs of the bearing retainer are otherwise unaltered and the force they exert against the bearing pushing the bearing against the bearing seat is not increased. This avoids any deformation of the bearing interior shaft bore. The projections of the bearing retainer extending into or digging into the exterior surface of the bearing restrict the swiveling or pivoting movement of the bearing relative to the end shield bearing seat.

The use of the self-aligning bearing assemblies described above in the construction of electric motors overcomes the problem of unintended movement of the motor's component parts relative to the motor end shield while the epoxy employed in the motor's assembly cures.

BRIEF DESCRIPTION OF THE DRAWINGS

Further features of the invention are set forth in the following detailed description of the preferred embodiments of the invention and in the drawing figures wherein:

FIG. 6 is a plan view of the bearing retainer of FIG. 5, removed from the motor end shield;

FIG. 7 is a side, sectioned view of the bearing retainer of FIG. 6; and

DETAILED DESCRIPTION OF THE PREFERRED EMBODIMENTS

Figure 1:
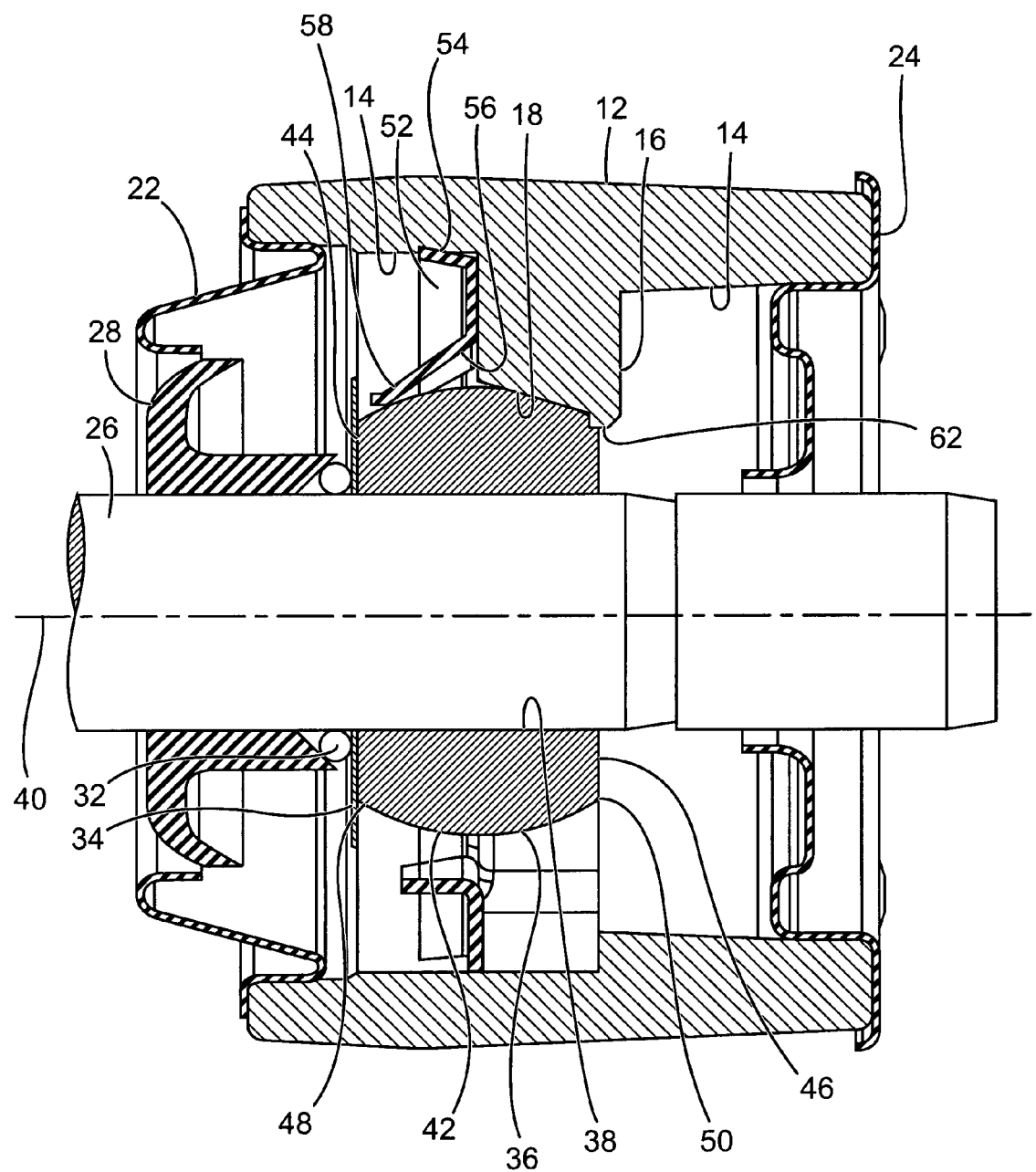
FIG. 1 is a partial, sectioned view of a first embodiment of the bearing assembly of the invention supporting a motor shaft in a motor end shield.

FIG. 1 shows one operative environment of the bearing assemblies of the invention. In the environment of FIG. 1, a bearing assembly is shown mounted in a portion of an electric motor end shield. However, this is only one environment in which the bearing assemblies of the invention may be used. Thus, the motor end shield environment should not be interpreted as limiting. Because the use of bearing assemblies in motor end shields is well-known, the end shield environment of FIG. 1 will only be described generally.

The portion of the electric motor end shield shown in FIG. 1 includes a cylindrical wall 12 having an interior shoulder surface 14. The shoulder surface 14 surrounds a shaft opening through the end shield. A plurality of radial walls 16 extend radially inwardly from the end shield cylindrical wall 12. In the embodiment shown, there were three radial walls 16 spatially arranged around the shaft opening through the end shield. Each radial wall extends inwardly from the end shield cylindrical wall 12 to a bearing seating surface 18 at the inner most end of the radial wall. The bearing seating surfaces 18 together comprise the bearing seating surface of the end shield.

A pair of end caps 22, 24 are mounted on the opposite ends of the end shield cylindrical wall 12. The end caps 22, 24 function to restrict contaminants such as dirt and dust from passing through the shaft opening in the end shield and also function to prevent the leakage of lubricant through the shaft opening.

A motor shaft 26 extends through the shaft opening in the end shield. The shaft 26 has an oil slinger 28 and a thrust washer assembly 32, 34 mounted on the shaft. A sintered, powdered metal, self-aligning bearing 36 is also mounted on the shaft.

The bearing 36 has a cylindrical center bore 38 that receives the shaft. A center axis 40 of the bearing bore defines mutually perpendicular axial and radial directions. The bearing center axis 40 is coaxial with the center axis of the shaft and the center axis of the end shield shaft opening defined by the bearing seating surfaces 18. The exterior surface of the bearing has a spherical configuration defined by a convex surface 42 of the bearing that extends completely around the bearing. The bearing exterior surface also has a pair of parallel, flat, end face surfaces 44, 46 at axially opposite ends of the bearing. The outer peripheral edges 48, 50 of the bearing end face surfaces 44, 46 intersect axially opposite ends of the bearing convex surface 42. The bearing convex surface 42 engages against the bearing seating surfaces 18 of the end shield and supports the shaft 26 for rotation relative to the end shield. As explained earlier, the engagement of the bearing convex surface 42 with the bearing seating surfaces 18 also permits some pivoting or swiveling movement of the shaft 26 relative to the end shield.

A disk-shaped retainer ring 52 holds the bearing 36 in engagement with the bearing seating surfaces 18. The retainer ring 52 is pressed into the end shield cylindrical wall 12 and engages against one side of the end shield radial walls 16. The ring 52 has a peripheral portion 54 that engages against the end shield shoulder surface 14 to hold the ring in place adjacent the bearing 36. The ring has a circular inner edge 56 that surrounds a shaft hole through the ring. A plurality of resilient fingers or tabs 58 project radially inwardly from the ring inner edge 56 and engage against the convex surface 42 of the bearing 36. These resilient tabs 58 exert a force on the bearing 36 that holds the bearing against the bearing seating surfaces 18. However, the force exerted by the resilient tabs 58 is not sufficient to potentially deform the center bore 38 of the bearing.

The construction of the bearing assembly of the invention described to this point is, for the most part, conventional. The bearing assembly of the invention differs from prior art bearing assemblies in that it employs a plurality of projections adjacent the bearing seating surfaces 18. The projections are positioned to engage with the self-aligning bearing 36 to limit the pivoting or swiveling movement of the bearing relative to the bearing seating surfaces.

Figure 2:
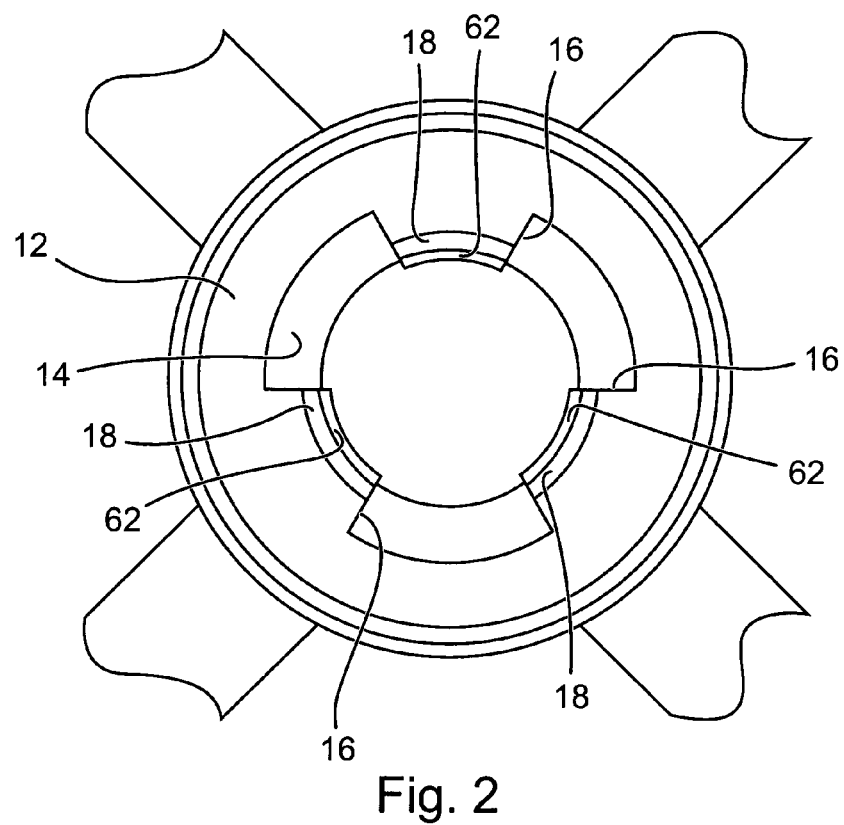
FIG. 2 is a partial view of the end shield bearing seat surfaces with the bearing removed.

A first embodiment of the projections 62 of the bearing assembly of the invention is shown in FIGS. 1 and 2. The projections 62 are positioned radially inwardly from the bearing seating surfaces 18 and are formed as integral parts of the end shield. In FIG. 2 only one projection 62 per bearing seating surface 18 is shown. This one projection 62 is centered relative to the bearing seating surface 18. However, other positionings of the projections 62 adjacent the bearing seating surfaces 18 may be employed. For example, a pair of projections 62 could be provided adjacent each bearing seating surface 18 at circumferentially opposite ends of the bearing seating surface. The projections 62 are positioned so that they will engage with the peripheral edge 50 of the bearing end face surface 46. This avoids any potential deformation of the bearing center bore 38. The bearing is installed with a force that causes the projections to deform the relatively soft, porous bearing material. This ensures that contact will always be made between the bearing and the projections regardless of the tolerance of the two parts. The engagement of the projections 62 with the bearing end face surface 46 functions to limit the swiveling or pivoting movement of the bearing 36 relative to the bearing seating surfaces 18. The resilience of the disk also acts to return the bearing to its proper position relative to the bearing seat if a force causes the bearing to be initially swiveled from its proper position. By limiting the pivoting or swiveling movement of the bearing 36 relative to the bearing seating surfaces 18, the disadvantages associated with the prior art self-aligning bearings are overcome.

Figure 3:
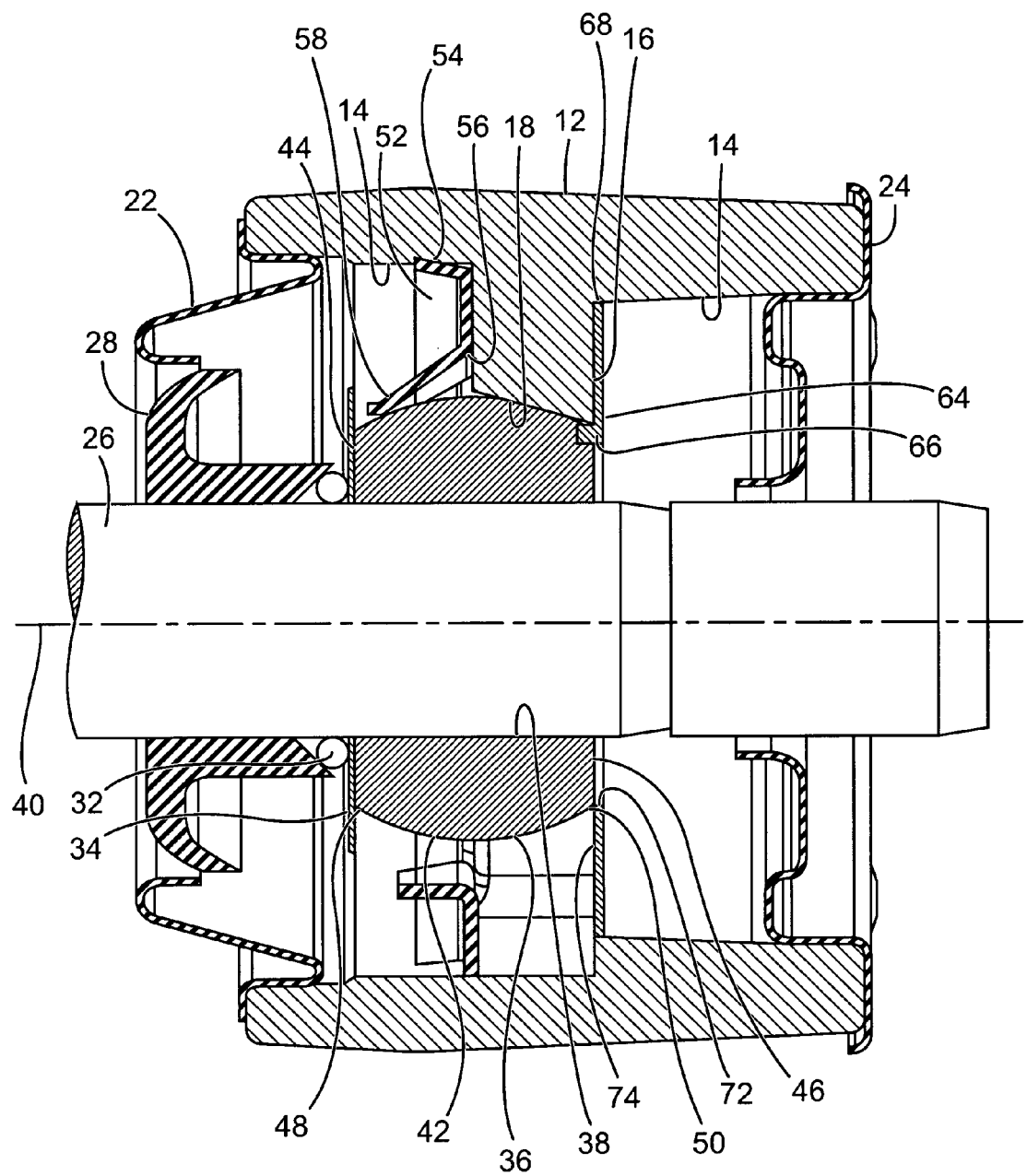
FIG. 3 is a partial, sectioned view similar to FIG. 1, showing a further embodiment of the bearing assembly employing a disk assembled to the motor end shield.

FIG. 3 shows a variant embodiment of the bearing assembly of FIG. 1. Many of the component parts of the bearing assembly of FIG. 3 are the same as those of FIG. 1, and are identified by the same reference numbers employed in FIG. 1. FIG. 3 differs from FIG. 1 in that the projections 62 of FIG. 1 that were integral parts of the end shield and formed adjacent the end shield bearing seating surfaces 18 are no longer present. Instead of the end shield projections 62, a circular disk 64 with projections 66 is employed to limit the pivoting or swiveling movement of the self-aligning bearing 36 relative to the bearing seating surfaces 18.

Figure 4:
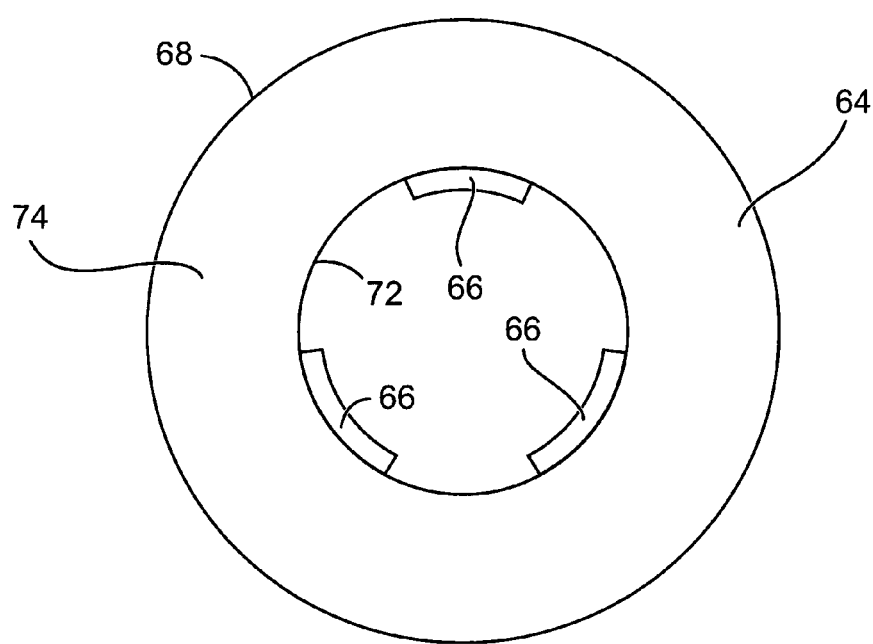
FIG. 4 is a plan view of the disk of FIG. 3 removed from the motor end shield.

The disk 64 is shown in FIG. 4 and is basically a thin metal disk having an outer, circular peripheral edge 68 and an inner, circular edge 72. The projections 66 are arcuate segments of the disk at the disk inner edge 72. As shown in FIG. 3, the arcuate projections 66 project axially from one surface 74 of the disk.

The disk 64 is installed on the end shield by pressing the disk into the end shield cylindrical wall 12 until the disk surface 74 with the projections 66 engages against the radial walls 16 of the end shield. The disk could also be bonded to the end shield or secured by other means. The projections 66 on the disk 64 project axially from the disk into the shaft opening defined by the bearing seating surfaces 18. With the bearing 36 held against the bearing seating surfaces 18 by the retainer ring 52, the disk projections 66 contact the bearing end face surface 46. The engagement of the projections 66 with the bearing end face surface 46 restricts the pivoting or swiveling movement of the bearing 36 relative to the bearing seating surfaces 18.

Figure 5:
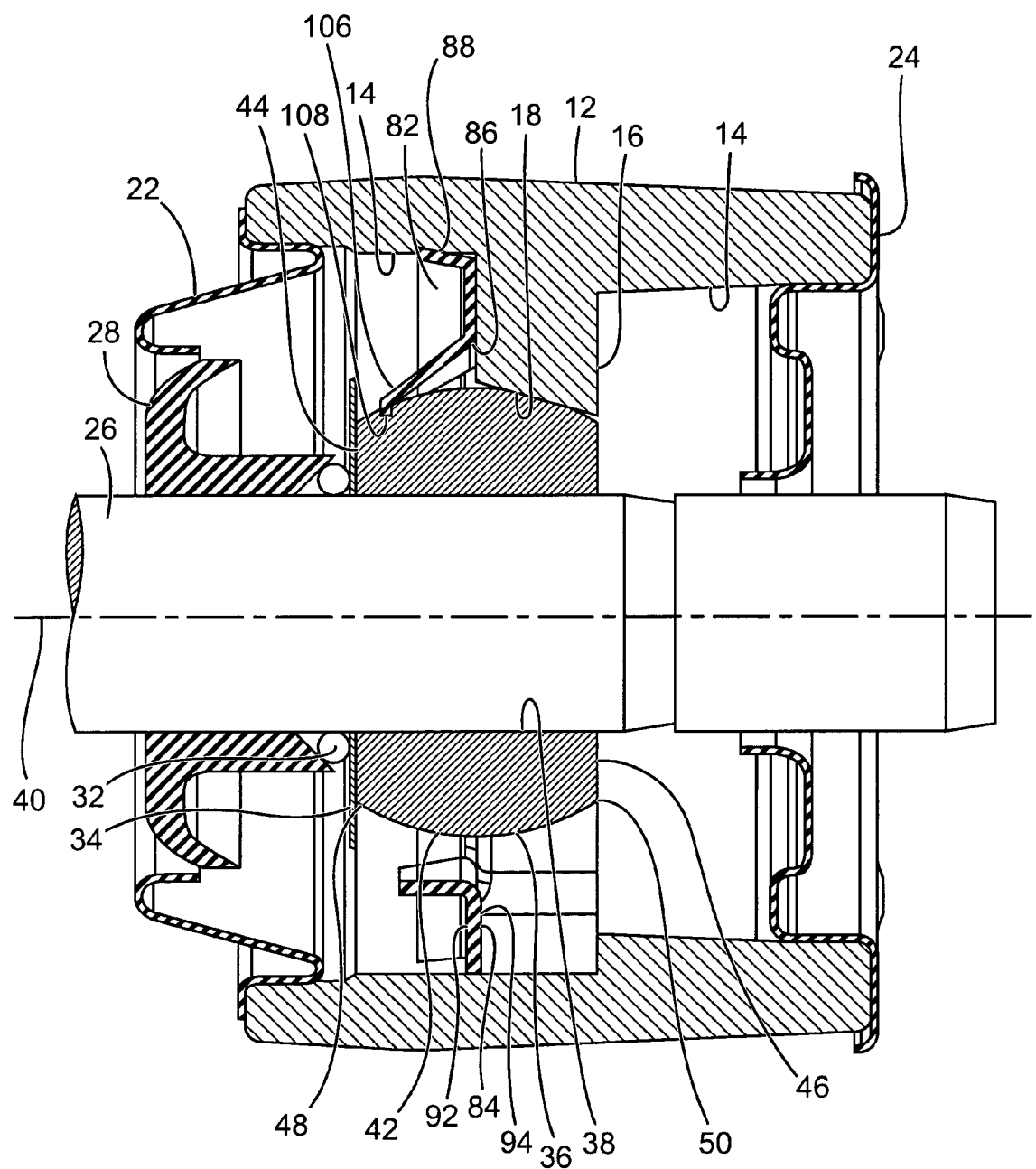
FIG. 5 is a partial, sectioned view of a further embodiment of the bearing assembly employing a modified bearing retainer.

FIG. 5 shows a further embodiment of the bearing assembly of the invention. Many of the component parts of the bearing assembly of FIG. 5 are the same as those of FIG. 1, and are identified by the same reference numbers employed in FIG. 1. FIG. 5 differs from FIG. 1 in that the projections 62 of FIG. 1 that were integral parts of the end shield and formed adjacent the end shield bearing seating surfaces 18 are no longer present. Instead of the end shield projections 62, a modified bearing retainer is employed to restrict the pivoting or swiveling movement of the bearing 36.

The bearing retainer 82 is shown removed from the motor end shield 12 in FIGS. 6 and 7. Like typical bearing retainers, the bearing retainer 82 is a stamped metal part. It is formed with a planar ring portion 84 with a circular inner edge 86. A peripheral portion 88 of the bearing retainer extends around the outer periphery of the ring portion 84. The ring portion 84 has opposite interior 92 and exterior 94 surfaces. The ring portion exterior surface 94 seats against the radial walls 16 of the end shield 12 as shown in FIG. 5.

The outer peripheral portion 88 of the bearing retainer 82 is formed with a plurality of arcuate flanges 96. The arcuate flanges 96 project at an angle from the ring portion 84. The width of the ring portion 84 and the angled orientation of the arcuate flanges 96 allows distal edges of the flanges to dig into the shoulder surface 14 of the end shield cylindrical wall 12 when mounting the retainer to the end shield. This securely holds the bearing retainer 82 in its position shown in FIG. 5. As shown in FIG. 6, the arcuate flanges 96 are separated from each other by pairs of notches 98 and radially projecting prongs 102 between the pairs of notches. The distal ends of the prongs 102 also engage and dig into the material of the end shield shoulder surface 14 to securely hold the bearing retainer 82 to the end shield 12.

A plurality of arcuate ridges 104 are formed in the bearing retainer ring portion 84 at the inner edge 86 of the ring portion. The arcuate ridges 104 are spatially arranged around the ring portion inner edge 86 at positions radially opposite the gaps formed by the notches 98 in the bearing retainer peripheral portion 88. Each of the arcuate ridges 104 project at an angle from the ring portion interior surface 92 to strengthen the ring portion 84 in the area of the notches 98.

Resilient tabs or fingers 106 project radially inwardly from the inner edge 86 of the bearing retainer ring portion 84. As shown in FIG. 6, the resilient tabs 106 are spatially arranged between pairs of the arcuate ridges 104. The tabs 106 are oriented at an angle relative to the bearing retainer ring portion 84 and engage against the exterior surface of the bearing 36 when the bearing retainer 82 is installed on the end shield 12 in the position shown in FIG. 5. The resiliency of the tabs 106 urges the bearing 36 against the bearing seating surfaces 18 of the end shield. However, the tabs 106 do not exert a sufficient force on the bearing 36 that would cause the center shaft hole 38 of the bearing to deform.

The construction of the bearing retainer 82 described to this point is, for the most point, conventional. The construction of the bearing retainer 82 of the invention differs from that of prior art bearing retainers in that pairs of fold over projections 108 are provided on the distal ends of each of the resilient tabs 106. As shown in FIG. 6, each resilient tab 106' is provided with fold over projections 108 at the radially inward ends of the tabs. In variant embodiments, different numbers of projections could be formed on the distal ends of each of the tabs 106. The resilience of the tabs 106 causes the projections 108 of each tab to engage with and dig into the exterior surface of the bearing 36 as shown in FIG. 5. The engagement of the projections 108 into the bearing convex surface 42 as shown in FIG. 5 restricts the pivoting or swiveling movement of the bearing 36 relative to the bearing seating surfaces 18.

Figure 8:
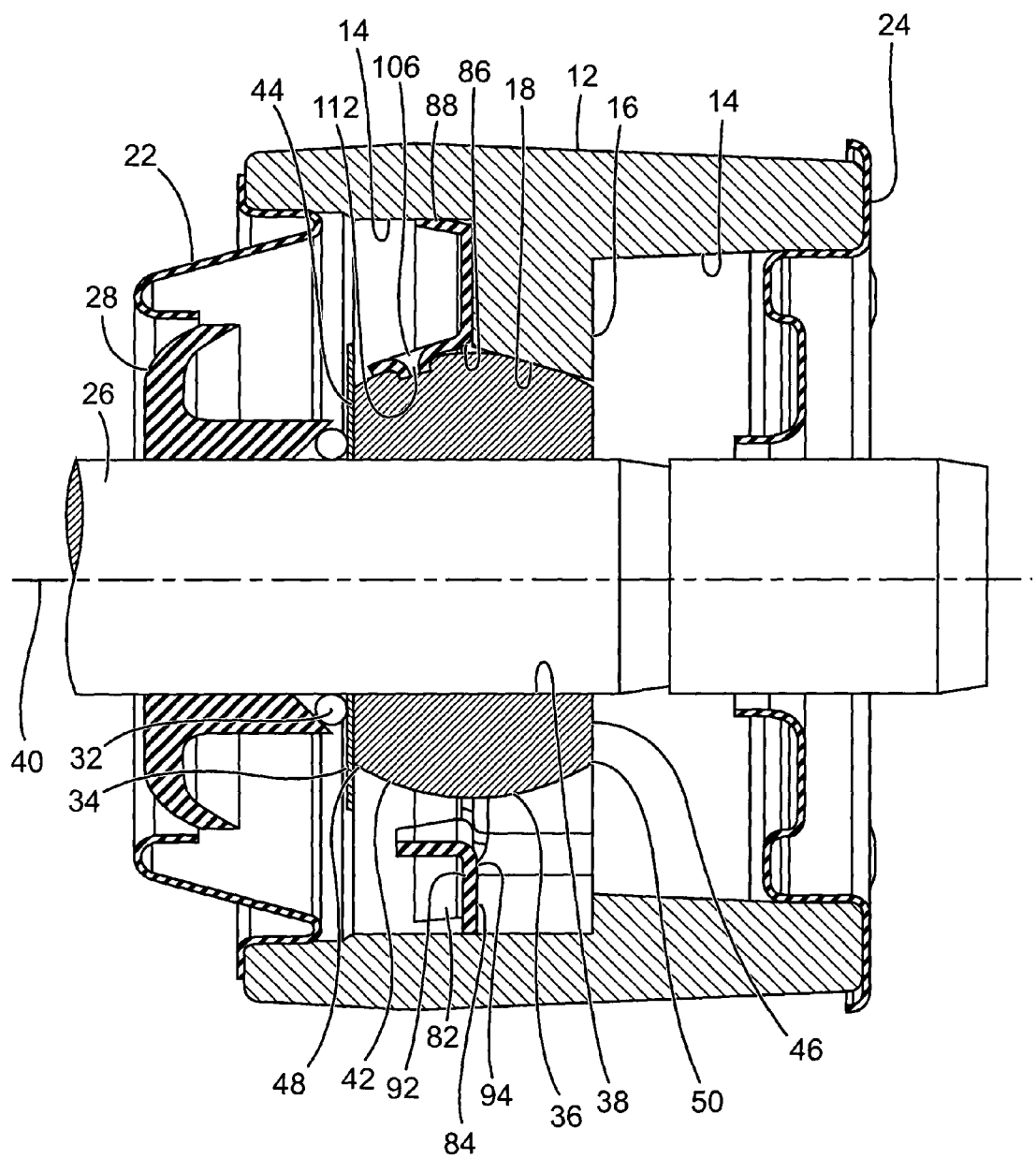
FIG. 8 is a partial, sectioned view of a further embodiment of the bearing assembly employing a modified bearing retainer.

FIG. 8 shows a further embodiment of the bearing assembly of the invention. Many of the component parts of the bearing assembly of FIG. 8 are the same as those shown in FIG. 5, and are identified by the same reference numbers employed in FIG. 5. FIG. 8 differs from FIG. 5 in that the projections 112 of the bearing retainer 82 are not formed on the distal ends of the resilient tabs 106 of the retainer, but are formed into interior portions of the resilient tabs 106. The projections 112 are formed in the tabs 106 by extruding holes into the interior portions of the tabs. This produces the projections 112 around the extruded holes. The resilience of the bearing retainer tabs 106 causes the projections 112 to engage with and dig into the convex surface 42 of the bearing 36. The engagement of the projections 112 into the bearing surface 42 restricts the pivoting or swiveling movement of the bearing 36 relative to the bearing seating surfaces 18.

The various embodiments of the bearing assemblies of the invention described above overcome the problems associated with the use of self-aligning bearings by restricting or limiting the pivoting or swiveling movement of the bearings in their bearing seats. Furthermore, the bearing assemblies of the invention overcome the problem of excessive pivoting or swiveling movement of the motor shaft bearings without resorting to more expensive ball bearing, roller bearing or babbitt bearing assemblies.

While the present invention has been described by reference to specific embodiments, it should be understood that modifications and variations of the invention may be constructed without departing from the scope of the invention defined in the following claims.

What is claimed is:

1. A bearing assembly comprising:
   a spherical bearing having a center bore, the center bore having a center axis that defines mutually perpendicular axial and radial directions, the bearing having an exterior surface with a pair of end face surfaces at axially opposite ends of the bearing and a convex surface between the pair of end face surfaces, the convex surface extending around the bearing axis;
   a bearing support having a bearing seating surface, the bearing seating surface engaging the bearing convex surface;
   a projection on the bearing support, the projection engaging with the bearing exterior surface;

the projection engaging with at least one of the bearing end face surfaces; and, the projection being one of a plurality of projections on the bearing support that engage with the bearing end face surface.

2. The bearing assembly of claim 1, further comprising:

the pair of bearing end face surfaces being flat, parallel surfaces that extend around the center bore.

3. The bearing assembly of claim 1, further comprising:

the bearing seating surface being on a wall having a hole through the wall, the bearing being positioned in the hole.

4. A bearing assembly comprising:

a spherical bearing having a center bore, the center bore having a center axis that defines mutually perpendicular axial and radial directions, the bearing having an exterior surface with a pair of end face surfaces at axially opposite ends of the bearing and a convex surface between the pair of end face surfaces, the convex surface extending around the bearing axis;

a bearing support having a bearing seating surface, the bearing seating surface engaging the bearing convex surface;

a projection on the bearing support, the projection engaging with the bearing exterior surface;

the projection engaging with at least one of the bearing end face surfaces;

a disk supported on the bearing support adjacent the bearing; and, the projection being on the disk.

5. The bearing assembly of claim 4, further comprising:

each bearing end face surface having a peripheral edge where the end face surface intersects the convex surface; and, the projection engaging into the at least one bearing end face surface at the peripheral edge.

6. The bearing assembly of claim 4, further comprising:

the projection being one of a plurality of projections on the disk that engage with the bearing end face surface.

7. The bearing assembly of claim 4, further comprising:

the disk having a center hole with a peripheral edge and the projection being on the center hole peripheral edge.

8. The bearing assembly of claim 4, further comprising:

the bearing seating surface being on a wall having a hole through the wall, the bearing being positioned in the hole, the wall extending radially outwardly from the hole to a shoulder surface that projects axially outwardly from the wall; and, the disk having an outer peripheral portion that engages with the shoulder surface.

9. A bearing assembly comprising:

a spherical bearing having a center bore, the center bore having a center axis that defines mutually perpendicular axial and radial directions, the bearing having an exterior surface with a pair of end face surfaces at axially opposite ends of the bearing and a convex surface between the pair of end face surfaces, the convex surface extending around the bearing axis;

a bearing support having a bearing seating surface, the bearing seating surface engaging the bearing convex surface;

a projection on the bearing support, the projection engaging with the bearing exterior surface;

the projection engaging into the bearing convex surface;

each bearing end face surface having a peripheral edge where the end face surface intersects the convex surface; and, the projection engaging into the convex surface between the end face surface peripheral edges.

10. The bearing assembly of claim 9, further comprising:

the projection being one of a plurality of projections on the bearing support that engages into the bearing convex surface.

11. The bearing assembly of claim 9, further comprising:

a disk supported on the bearing support adjacent the bearing; and, the projection being on the disk.

12. The bearing assembly of claim 11, further comprising:

the projection being one of a plurality of projections on the disk that engage into the bearing convex surface.

13. The bearing assembly of claim 11, further comprising:

the disk having a center hole with a peripheral edge and a plurality of resilient tabs extending radially inwardly from the peripheral edge, the plurality of tabs engaging with the bearing; and, the projection being on one of the tabs.

14. The bearing assembly of claim 13, further comprising:

the bearing seating surface being on a wall having a hole through the wall, the bearing being positioned in the hole, the wall extending radially outwardly from the hole to a shoulder surface that projects axially outwardly from the wall; and, the disk having an outer peripheral portion that engages with the shoulder surface.

15. A bearing assembly comprising:

a bearing having an exterior surface and a center bore with a center axis that defines mutually perpendicular axial and radial directions relative to the bearing;

a bearing support having a bearing seating surface, the bearing seating surface engaging the bearing exterior surface;

a disk supported on the bearing support adjacent the bearing; and, a projection on the disk, the projection engaging into the bearing exterior surface;

the disk having a center hole with a peripheral edge and a plurality of resilient tabs that extend radially inwardly from the peripheral edge, the plurality of tabs engaging with the bearing exterior surface; and the projection being on one of the tabs.

16. The bearing assembly of claim 15, further comprising:

the projection being one of a plurality of projections on the disk, the plurality of projections engaging into the bearing exterior surface.

17. The bearing assembly of claim 15, further comprising:

the bearing seating surface being on a wall having a hole through the wall, the bearing being positioned in the hole.

18. The bearing assembly of claim 17, further comprising:

the wall extending radially outwardly from the hole to a shoulder surface that projects axially outwardly from the wall; and, the disk having an outer peripheral portion that engages with the shoulder surface.

19. The bearing assembly of claim 15, further comprising:

the projection being one of a plurality of projections on the plurality of tabs, the plurality of projections engaging into the bearing exterior surface.

* * * * *